March 15, 1960
N. W. TAYLOR
2,928,341
VIBRATING INKER ROLL
Filed June 6, 1955
2 Sheets-Sheet 1
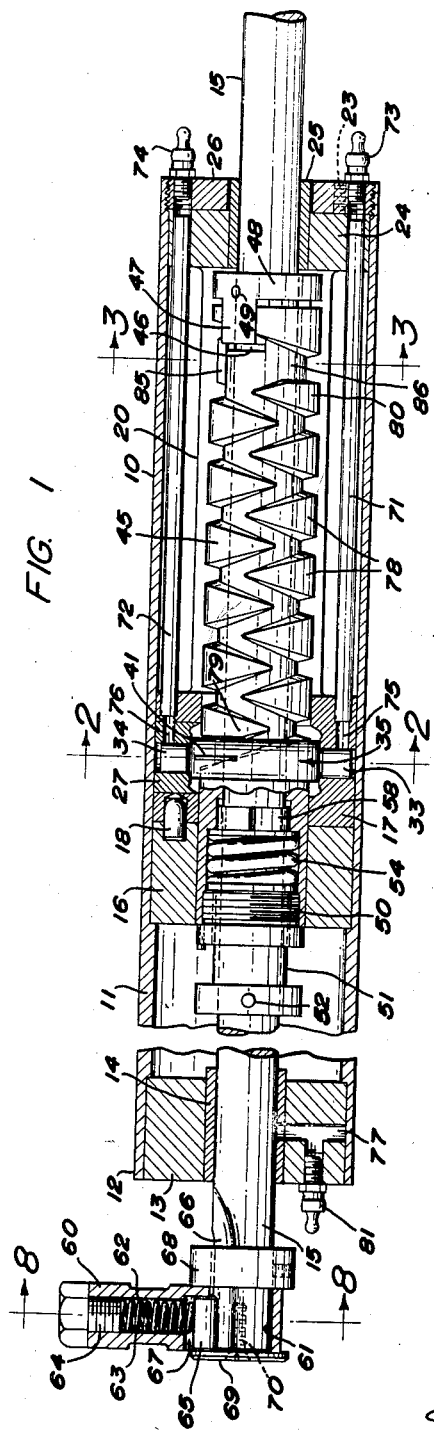
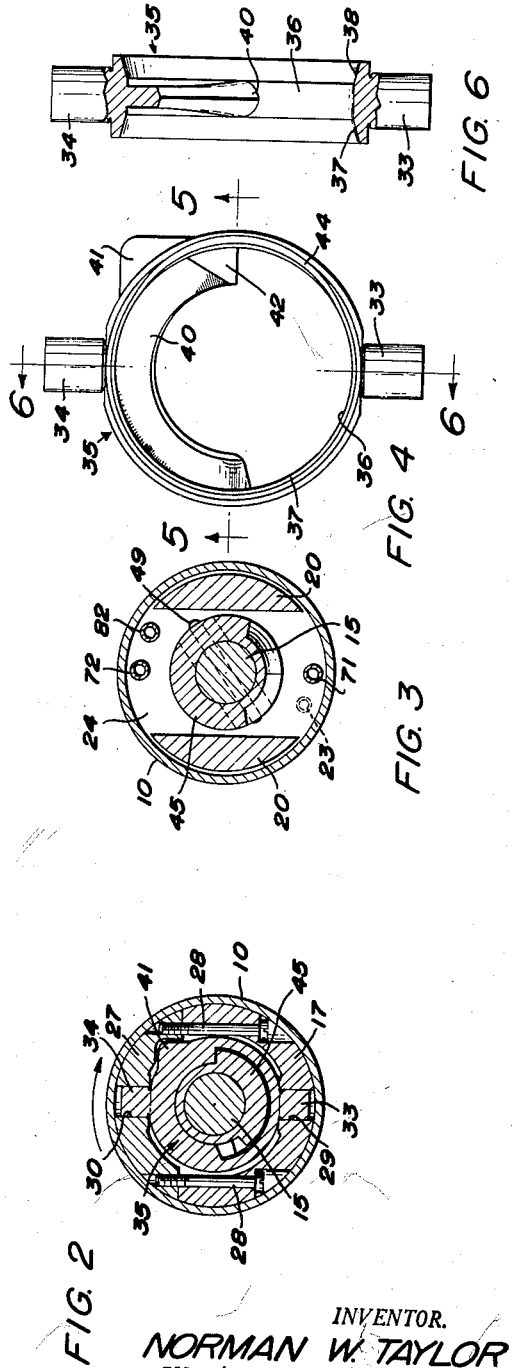
INVENTOR.
NORMAN W. TAYLOR
BY Hudson Boughton,
Williams, David & Hoffmann
ATTORNEYS March 15, 1960

N. W. TAYLOR 2,928,341

VIBRATING INKER ROLL

Filed June 6, 1955

INVENTOR.
NORMAN W. TAYLOR
BY Hudson & Boughton,
Williams, David & Hoffmann
ATTORNEYS

United States Patent Office 2,928,341
Patented Mar. 15, 1960

2,928,341

VIBRATING INKER ROLL

Norman W. Taylor, Cleveland Heights, Ohio, assignor to Harris-Intertype Corporation, Cleveland, Ohio, a corporation of Delaware Application June 6, 1955, Serial No. 513,374

12 Claims. (Cl. 101—348)

This invention relates to improvements in vibrating inker rolls, that is to say rolls employed in inking mechanisms which automatically reciprocate as they rotate. These vibrator rolls are rotated by friction from one or more other rolls with which they contact, and the reciprocation is automatically motivated by the rotation and imparted by internal mechanism in the vibrator roll. The purpose of the vibrating action of one or more of the rolls of an inker is to spread and smooth the ink. The present invention in some of its aspects constitutes an improvement upon a copending application Serial No. 343,313, filed March 19, 1953 by Noel Davis, now U.S. Patent 2,745,343.

One of the objects of the invention is to provide a reversing or switching thread follower having opposed faces which alternately engage with right and left hand threads of a screw with which the follower cooperates, said faces having generated surfaces which correspond to the helices of the right and left hand threads so as to provide a maximum amount of surface contact between the faces and the threads.

Another object of the invention is to provide that the thread follower have its thread engaging surfaces encompass approximately 180° of the screw whereby the large area of surface contact between the faces of the follower and the threads of the screw minimizes play between the cooperating parts, thus decreasing wear.

Still another object is the provision of an automatic vibrator roll mounted for rotation about a normally stationary screw having right and left hand threads, said roll having mounted therein a thread follower with helically generated faces on opposite sides, one of which corresponds to and mates with the right hand thread and the other of which corresponds to and mates with the left hand thread of the screw.

Another object of the invention is the provision of cushioning means which shall be effective at both ends of roll travel to absorb shock when the direction of endwise reciprocation of the roll is reversed.

Another object of the invention is the provision of an anchor for a shaft carrying the screw, which anchor clutches the shaft and maintains it fixed against rotation when the roll is turning in its normal direction, but which yields to permit screw and shaft rotation with the roll when the latter is turned in a direction opposite to its normal operation, as may occur during preparation for printing or cleaning the inker.

A further object of the invention is to provide clutch means for the shaft when the roll is rotating in the normal direction which means maintains the shaft and screw stationary during normal operation but permits screw and shaft rotation with the roll in case parts should bind.

Other objects and features of novelty will appear as I proceed with the description of that embodiment of the invention which, for the purposes of the present application I have illustrated in the accompanying drawings, in which Fig. 1 is a longitudinal central sectional view of an automatic vibrator roll embodying the invention;

Figs. 2 and 3 are cross-sectional views taken substantially on the lines 2—2 and 3—3 of Fig. 1;

Fig. 4 is a detail side elevational view on a larger scale of the thread follower of the invention mounted in an annulus which oscillates or swivels on opposed trunnions;

Fig. 6 is a sectional view at right angles to that of Fig. 5 taken substantially on the line 6—6 of Fig. 4;

Figure 5:
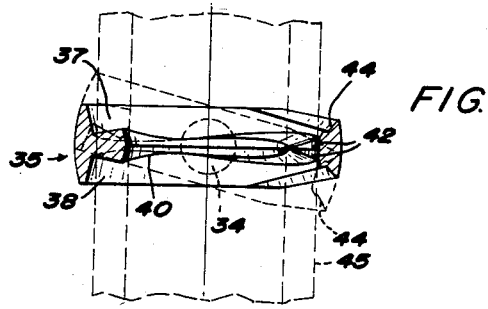
Fig. 5 is a cross-sectional view taken substantially on the line 5—5 of Fig. 4.

In the drawings 10 is a cylindrical shell of an automatic vibrator roll. As will be shown, the roll is mounted for rotation and reciprocation on a shaft 15 which is normally fixed in position but which may be free to rotate under certain conditions which will be described later. The surface of the shell 10 runs in contact with one or more rolls of a printing press inker to effectively spread and smooth out the ink. The inker rolls with which the shell 10 engages impart rotation to the shell by friction. The shell has mounted therein a reversing thread follower 40 which engages with the threads of a screw 45. The screw 45 may be formed in a sleeve that is mounted upon shaft 15 and is fixed against rotation relative to shaft 15, but is permitted to have a small amount of endwise movement. The screw 45 is formed with both right and left hand threads for the well-known purpose of imparting a reciprocating movement to the vibrator roll as the follower 40 follows the threads. The follower engages with the threads in the usual manner, following first one thread to its end, reversing and following back along the other thread to its end, again reversing and so on.

The cylindrical shell 10 has a portion 11 of somewhat greater thickness than the balance of the shell. A thinner walled portion 12 at the left end of the roll, as viewed in Figure 1, is closed by a solid metal plug 13 which carries a bushing 14 that is slidable as well as rotatable upon the shaft 15. At the opposite end of the thicker wall portion 11 there is another plug 16 having a bore of sufficient size to clear a portion of the screw 45 passing therethrough. Abutting against the plug 16 there is an internal housing comprising heads 17 and 24 at its opposite ends, these heads being connected together by a pair of longitudinal bars 20, shown best in Figure 3. The internal housing is prevented from rotating with respect to the shell 10 by a dowel 18 provided in the plug 16, which dowel enters a recess in the head 17 of the internal housing. Head 24 carries a bushing 25 that is slidable and rotatable upon the shaft 15. At the right hand end, the shell 10 is internally threaded to receive an externally threaded annular nut 26 which surrounds a portion of bushing 25 and by means of which the housing is held up against the plug 16 and locked with respect to the shell 10. A set screw 23 threaded into the annular nut 26 prevents the nut from rotating relative to the internal housing.

The upper portion of the head 17 of the housing as viewed in Figures 1 and 2 is cut away to receive a cap 27 which in the assembled condition is secured to the head by means of screws 28. Diametrically opposed and concentric bores 29 and 30 are provided in the head 17 and cap 27 respectively, these bores receiving coaxial trunnions 33 and 34 which project outwardly from the annulus 35.

The outer surface of annulus 35 is substantially spherical. Its inner surface may comprise a cylindrical land 36 and two outwardly flared or beveled surfaces 37 and 38. The thread follower 40 having the shape and extent of a half-ring is formed integral with the annulus 35. Each of the two sides of the thread follower 40 which bears against the threads of the screw is helically generated to accurately fit the screw thread with which it engages. The annulus 35 carrying the follower 40 together with the trunnions 33 and 34, will be referred to hereinafter as an oscillator, since this unit oscillates or swivels at each end of its travel along the screw. At the leading edge of the follower 40, the sides are slightly beveled forwardly as at 42. These bevels facilitate getting lubrication between the follower and the screw by what might be described as a sledding action. As shown, the thread follower encompasses about 180° of the screw 45. The load is thus evenly concentrated over a large area. This not only prevents swiveling of the oscillator intermediate the ends of the screw threads as is common with conventional mechanisms, but further stabilizes the oscillator thus preventing wiggling which ultimately results in wear and possibly breakage. The large area of surface contact between the follower and the screw permits the follower to cross the thread leading in the opposite direction without heavily loading the thin points formed at the intersections of the right and left hand threads.

Since the sides of the follower are formed of two oppositely generated helices, each side of the follower obviously can fit properly only when going in one direction relative to the screw 45. For this reason, the follower can be assembled only in the position indicated in the drawings. To prevent the oscillator from being installed incorrectly in the vibrator roll, one exterior wall of the annulus 35 is provided with a projection 41 which can be received only in a socket provided for it in the cap 27. This socket is of sufficient width and has enough clearance with respect to the projection 41 to permit free reversing of the oscillator through the necessary angle as the thread follower shifts from one thread to the other.

On the forward side of the annulus 35 the bevels 37 and 38 are relieved as indicated at 44 in Figures 4 and 5 so that in whichever direction the follower travels, the lubricant in the interior of the vibrator roll is caused to flow into the threads of the screw to minimize friction between the thread follower and the screw threads. As partially shown in Figure 5, the follower 40 follows the threads of the screw 45 at an angle to the axis of the screw. The leading edge is shown downwardly inclined in dotted lines and the follower is moving downwardly. During this time, lower relief 44 assists in lubrication of the parts. Upon reversing, the leading edge of the follower will be inclined upwardly and upper relief 44 will then function. The neutral position of the follower with respect to the screw is shown in Figure 5 in solid lines. Without the provision of reliefs 44, there would be a tendency of the thread follower to wipe lubricant from the surface of the screw 45.

Figure 7:
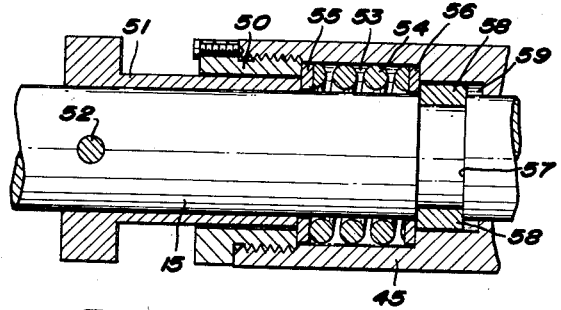
Fig. 7 is a fragmental detail sectional view on a larger scale showing cushioning means between the shaft and the sleeve which carries the screw.

As mentioned earlier, the screw 45 is fixedly mounted against rotation upon shaft 15. For this purpose projections 47 on a collar 48 enter into longitudinal recesses 46 in the screw 45 at the right end thereof as viewed in Figure 1. The collar 48 is secured to the shaft 15 by a tapered pin 49. It will be noticed that a small amount of clearance is provided between the right end of the screw and the collar 48, and also between the inner ends of the projections 47 and the ends of the recesses 46. This provision is to permit endwise movement of the sleeve carrying screw 45 relative to the shaft 15. The sleeve carrying screw 45 is threaded internally at its left end to receive a hollow nut 50 which surrounds a shouldered collar 51 that is fastened to the shaft 15 by a tapered pin 52. The sleeve is provided with an annular recess 53 which receives a spring 54 intermediate two rings or washers 55 and 56. An annular groove 57 is provided in the shaft to receive half collars 58 which project outwardly beyond the shaft into an annular socket 59 of the sleeve. The half collars 58 provide shoulders on the shaft 15 for purposes which will be apparent later. The function of the parts just described is to cushion the shock of reversing and thereby prevent breakage of parts of the vibrator roll when the roll changes direction of reciprocating movement. On a high speed printing press the forces between the thread follower and the screw thread are very high when reversal of the follower from a thread running in one direction to a thread running in the opposite direction takes place. In the present invention, when the thread follower 40 reaches the right end of travel as viewed in Figure 1, the screw sleeve travels a slight distance toward the right as permitted by the space between the right end of the screw and the collar 48. As shown in Figure 7, when this takes place the nut 50 which is threaded into the sleeve pushes on ring 55 and compresses the spring 54 against the ring 56 which is up against a shoulder formed by the half collars 58. There is a separation between ring 56 and that portion of the sleeve which it normally engages, due to the rightward travel of the screw 45 as the screw takes the brunt of the force imparted by the thread follower in reversing. When reversal of the thread follower 40 takes place, the screw reaches the end of its travel in this direction and the spring 54 cushions the movement and starts the screw back in the opposite direction to smoothly restore it to its original position.

Figure 8:
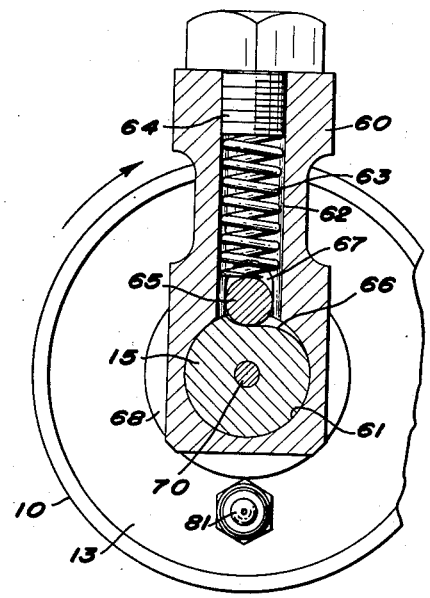
Fig. 8 is a sectional view on a larger scale taken substantially on the line 8—8 of Fig. 1, showing the one-way clutch for releasably locking the shaft against rotation during normal operation of the roll.

The right end of the shaft 15, as viewed in Figure 1, is restrained against axial or radial movement by any suitable means, but is freely rotatable to permit such rotation when necessary. The left end of the shaft 15 is carried in an anchor 60 mounted in the machine frame in any suitable manner. The anchor comprises a smooth bearing 61 for the left end of the shaft 15. In the anchor 60 there is an upright cylindrical chamber 62 which receives a spring 63. A screw 64 compresses the spring 63 against a roller detent 65 which rides in a recess 66 in the left end of the shaft. The detent 65 is guided for slight up and down movement in a slot 67 in the hanger. The recess 66 in the shaft end is shown as having an abrupt wall on one side fitting the contour of the roller detent 65 while on the opposite side it runs out in a smooth curve merging with the periphery of the shaft 15. As indicated by the arrow in Figure 8, the shell 10 normally turns clockwise and any tendency for the shaft 15 to turn along with the shell is opposed by the abrupt side of recess 66 against the roller detent 65 thereby holding the shaft from turning. However, when the shell is turned in the reverse direction as it may need to be during cleaning of the inker, the thread follower will engage one of a pair of abutments 85 formed at the ends of the threads by providing cutouts 86, the purpose of which will presently be described, see Figure 9. It is to be understood that a given side of the thread follower 40 will engage only one side, the thrust side, of its thread during reciprocation. When the shell 10 is rotated in the reverse direction, the opposite side of the screw thread will be engaged by the thread follower surface normally cooperating with the screw thread running in the opposite direction. To prevent wear between these unlike surfaces, the abutment 85 catches the tail end of the thread follower and rotates the shaft 15 in the reverse direction with the follower and shell. Due to the gradual curve of the recess 66, the shaft 15 may rotate counterclockwise without being restrained by the roller detent 65. During normal clockwise running of the roll, should binding of parts occur, the force applied to the shaft 15 may push the detent 65 out of recess 66. When this happens, a clicking sound will result, signalling to the press operator that the vibrator roll is not reciprocating. This provision of the recess 66 and spring urged roller detent 65 at the left end of the shaft 15 minimizes the possibility of breakage of parts due to the fact that in the event parts do bind, the screw 45 is permitted to rotate with the roll.

A collar 68 secured to shaft 15 abuts the anchor 60 on one side, and the end of the shaft carries a plate 69 which is secured to the shaft by a screw 70. In this manner the shaft is held against endwise movement relative to the anchor.

In view of the rather heavy strains placed upon the thread follower, the lubrication of the parts must be generous. To this end, I provide tubular conductors 71 and 72 mounted in and extending between the heads 17 and 24. These conductors are supplied with lubricant through grease fittings 73 and 74 of conventional character mounted in the end nut 26. At their inner ends, these conductors deliver lubricant to bores 75 and 76 at the head 17 and cap 27, which bores communicate with the bores 29 and 30 journalling the trunnions 33 and 34 of the thread follower. The bushing 14 on the left end of the roll is lubricated through a passage 77 which is supplied with lubricant through a grease fitting 81. Lubricant is provided to the threaded screw through a grease fitting (not shown) which communicates with a tube 82 shown in Fig. 3.

Figure 9:
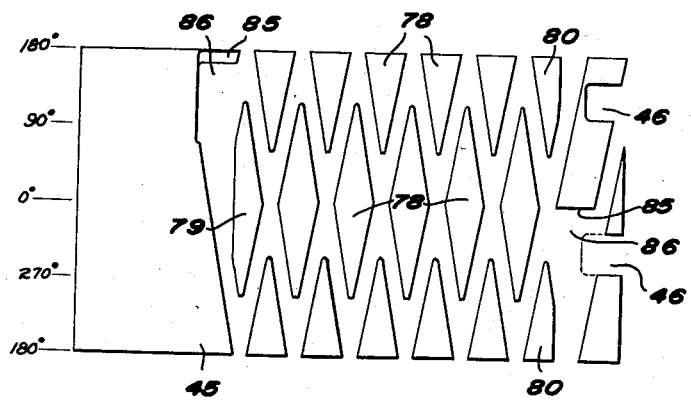
Fig. 9 is a development taken on the pitch circumference of the screw.

It will be noted from the development of the pitch circumference of the screw illustrated in Figure 9 that the right and left hand threads formed in the screw 45 leave lands 78 of diamond shape that are a little longer than half the periphery of the screw and overlap each other. The land 79 at one end and 80 at the other end are flattened on one side in order to provide for ease of reversing of the thread follower. Cutouts 86 also assist in reversal of the follower by permitting the trailing end of the follower 40 to move into the cutout as the follower switches from one thread to the other.

In Figure 1 the roll is shown in its furthermost left hand position. The thread follower 40 is about to shift from one thread to the other and force exerted by the roll and the internal housing parts is about to be absorbed by the spring 54. Such absorption takes place while the threaded screw travels slightly to the left as permitted by the space between the bottom of socket 59 in the sleeve and the right end shoulder formed by the half collars 58 mounted on the shaft. During this leftward movement, the ring 56 compresses the spring 54 against the ring 55 which in turn is backed up by the fixed collar 51. The oscillator pivots on its trunnions 33, 34 and begins to move toward the right carrying along with it the shell 10 and associated parts. As the oscillator reaches the right hand end of the two-way screw, the screw receives the thrust of the thread follower and moves to the right. As described earlier, the nut 50 threaded into the sleeve imparts this thrust to the ring 55 which compresses spring 54 against ring 56, thus cushioning the movement of the shell 10 in that direction. This procedure takes place repeatedly so long as the vibrator roll is driven in the normal direction of operation by driven rolls frictionally engaging the cylindrical shell 10.

It will be observed that I have provided a thread follower which has its surfaces engaging corresponding surfaces of the screw thread over a large area. The load and stresses are uniform and distributed evenly between the thread form of the follower and the screw threads.

While in the preferred form of the invention I mount the oscillator and thread follower in the roll, other forms of the invention are also possible. For example, the follower may be swively mounted in the shaft and engage internal right and left hand screw threads carried by the roll. Still other forms within the spirit and scope of this invention are possible.

Having thus described my invention, I claim:

1. In an automatic vibrator roll, a member having right and left hand threads, and a second member adapted to alternately engage first with one and then with the other of said threads, said second member having a portion defining helically-generated thread-engaging surfaces on opposite sides thereof, one of which surfaces accurately fits the thrust side of said right hand thread and the other of which surfaces accurately fits the thrust side of said left hand thread, one of said members being normally restrained against rotational and endwise movement and the other of said members being carried by said roll and being rotatable and free to move endwise whereby rotation of said latter member causes the roll to reciprocate within limits defined by the ends of the right and left hand threads.

2. The invention set forth in claim 1 wherein a single shock absorbing means is provided to cooperate with the normally restrained member to cushion the load exerted thereupon by the reciprocating member when the latter member reverses direction of reciprocation at each end of its travel.

3. In a rotatable roller adapted to automatically reciprocate as it rotates, a screw fixed against rotation, support means for said screw, said screw having right and left hand threads, a rotatable hollow cylindrical shell coaxial with and enclosing said screw, a thread follower, and means swively journaling the follower in said shell about an axis perpendicular to the axis of said shell, said follower having thread-engaging surfaces on opposite sides thereof for a substantial length, one of which surfaces is helically generated and corresponds to and mates with the helix of the right hand thread and the other of which surfaces is helically generated and corresponds to and mates with the helix of the left hand thread.

4. The invention set forth in claim 3 in which mating means is provided on said follower and in said shell necessitating assembly of said follower in said shell in a given relation to said screw.

5. The invention set forth in claim 3 including means for maintaining said screw fixed against rotation during normal operation of the roller in a forward direction and for releasing said screw for rotation with the shell during rotation of the roller in a reverse direction.

6. The invention set forth in claim 3 in which the end of the thread-engaging portion of the follower leading into the screw threads is bevelled forwardly whereby lubricant on said threads engaged by said bevels is urged between the helically generated surfaces and the thrust surfaces of the threads engaged thereby.

7. The invention set forth in claim 3 wherein the screw is capable of moving endwise to a small extent relative to its support, and wherein a single shock absorbing spring cooperates with said screw to cushion the loads between the follower and the screw during reversal of direction of reciprocation of the shell at both ends of its travel.

8. In an automatic vibrator roll, a normally fixed shaft, a screw mounted thereon fixed against rotation but capable of slight axial movement, said screw having right and left hand threads, a hollow cylindrical roll enclosing said screw, said roll being adapted to be rotated by contact with a driven roll, an oscillator comprising a thread follower carried by said roll and swively journaled about an axis perpendicular to the axis of said roll, deflecting means at the ends of said screw for engagement with said follower to swivel said oscillator on its axis and cause said follower to enter the reverse thread, a single cushion spring surrounding said shaft, and interrelated means on said shaft and screw for compressing said spring and enabling movement of the screw relative to the shaft at the time said follower reaches the end of its movement in each direction, whereby reversal of movement at both ends of the longitudinal travel of the roll is cushioned.

9. An automatic vibrator roll as defined in claim 8, wherein said cushioning means comprises two slidable rings surrounding said shaft at opposite ends of said spring, said screw having an internal annular recess receiving said spring and rings, and means on the screw adapted to engage one ring when the screw receives an impact from the roll at one end of the axial travel of the roll and adapted to engage the other ring when the screw receives an impact from roll travel in the opposite direction, whereby reversal in both directions is cushioned.

10. In an automatic roll, a shaft, a two-way screw on said shaft, a hollow roll enclosing said screw slidably and rotatably mounted on said shaft, a thread follower in said roll comprising a thread form cooperating with the threads of said screw for reciprocating the roll on the shaft as the roll is rotated, means for clutching said shaft against rotation as the follower moves forward in one thread or the other, but permitting the shaft and screw to turn with said follower and roll in case the parts bind, said means for clutching said shaft against rotation comprising an anchor having a bearing for the shaft, a recess in the shaft having an abrupt wall on one side and a gradual sloping wall on the other, and a spring pressed roller detent in said anchor normally engaging said recess and normally holding the shaft against turning when the roll rotates in the forward direction, but rolling out onto the surface of the shaft when the roll rotates in the rearward direction and presenting no substantial opposition to shaft rotation in the latter direction, whereby the follower travels endwise in the screw when the roll rotates in the forward direction and communicates rotation to the shaft and screw when the roll rotates in the rearward direction.

11. The invention set forth in claim 8 in which the follower comprises thread-engaging surfaces on opposite sides, each of which surfaces is helically generated one to correspond to and accurately fit the thrust side of the right hand thread and the other to correspond to and accurately fit the thrust side of the left hand thread for a substantial length.

12. In an automatic vibrator roll, a normally fixed shaft, a screw mounted thereon fixed against rotation but capable of slight axial movement relative to the shaft, said screw having right and left hand threads, a hollow cylindrical roll enclosing said screw, said roll being adapted to be rotated by contact with a driven roll, a thread follower carried by said roll, means alternately engaging the follower first with one and then with the other of said threads, cushion spring means, and means between said shaft and screw for compressing the spring means and enabling movement of the screw relative to the shaft at the time said follower reaches the end of its movement in each direction, whereby reversal of movement at both ends of the longitudinal travel of the roll is cushioned.

References Cited in the file of this patent

UNITED STATES PATENTS

| | | |
|---|---|---|
| 1,222,744 | Doyle | Apr. 17, 1917 |
| 1,490,635 | Ramsaier | Apr. 15, 1924 |
| 1,584,255 | Temmen | May 11, 1926 |
| 2,006,302 | Robbins | June 25, 1935 |
| 2,745,343 | Davis | May 15, 1956 |